(12) United States Patent
Müller

(10) Patent No.: US 12,226,828 B2
(45) Date of Patent: Feb. 18, 2025

(54) CALIBRATION METHOD

(71) Applicant: DORST TECHNOLOGIES GMBH & CO. KG, Kochel am See (DE)

(72) Inventor: Christian Müller, Großweil (DE)

(73) Assignee: DORST TECHNOLOGIES GMBH & CO. KG, Kochel am See (DE)

( * ) Notice: Subject to any disclaimer, the term of this patent is extended or adjusted under 35 U.S.C. 154(b) by 109 days.

(21) Appl. No.: 16/979,120

(22) PCT Filed: Feb. 28, 2019

(86) PCT No.: PCT/EP2019/055024
§ 371 (c)(1),
(2) Date: Sep. 8, 2020

(87) PCT Pub. No.: WO2019/185286
PCT Pub. Date: Oct. 3, 2019

(65) Prior Publication Data
US 2021/0008626 A1   Jan. 14, 2021

(30) Foreign Application Priority Data
Mar. 29, 2018   (DE) ..................... 10 2018 107 637.1

(51) Int. Cl.
*B22F 3/16* (2006.01)
*B30B 11/00* (2006.01)

(52) U.S. Cl.
CPC ............ *B22F 3/164* (2013.01); *B30B 11/005* (2013.01); *B22F 2003/166* (2013.01); *B22F 2998/10* (2013.01)

(58) Field of Classification Search
CPC ................ B22F 3/164; B22F 2003/166; B22F 2998/10; B30B 11/005
See application file for complete search history.

(56) References Cited

U.S. PATENT DOCUMENTS 6,161,407 A      12/2000  Meisser
8,474,295 B2 *   7/2013   Schmid ................... B22F 3/164
                                                          72/359

FOREIGN PATENT DOCUMENTS

| DE | 8224332 U1 | 10/1982 | |
| DE | 10301224 A1 * | 8/2004 | ........... B30B 11/005 |
| DE | 102004012858 B4 * | 4/2006 | ................ B21J 5/02 |
| DE | 10 2009 004 620 A1 | 7/2010 | |
| DE | 10 2010 009 800 B3 | 6/2011 | |
| DE | 10 2014 003 726 A1 | 9/2015 | |
| DE | 10 2015 201 775 A1 | 8/2016 | |

(Continued)

OTHER PUBLICATIONS

DE-102004012858-B4 english translation (Year: 2006).*

(Continued)

*Primary Examiner* — Ricardo D Morales
(74) *Attorney, Agent, or Firm* — Knobbe, Martens, Olson & Bear, LLP

(57) ABSTRACT

The invention relates to a method for calibrating, in particular, sintered pressed parts, wherein a calibration procedure of each individual pressed part is controlled depending on at least one specific pressed part parameter of the respective pressed part measured before calibration and/or depending on at least one production parameter of a preceding pressing and/or sintering step of the respective pressed part.

19 Claims, 1 Drawing Sheet

(56) References Cited

FOREIGN PATENT DOCUMENTS

| | | |
|---|---|---|
| DE | 10 2015 201 784 A1 | 8/2016 |
| DE | 10 2015 201 785 A1 | 8/2016 |
| DE | 10 2015 201 966 A1 | 8/2016 |
| EP | 1 202 404 A1 | 5/2002 |
| EP | 1 635 432 A1 | 3/2006 |
| EP | 1 964 664 A1 | 9/2008 |
| EP | 2 060 346 A2 | 5/2009 |
| EP | 2 698 885 A1 | 2/2014 |
| EP | 3147071 A1 | 3/2017 |
| JP | S64-25904 A | 1/1989 |
| JP | H4-94900 A | 3/1992 |
| JP | H5-255708 A | 10/1993 |
| JP | H6-55297 A | 3/1994 |

OTHER PUBLICATIONS

Japanese Office Action issued in the corresponding Japanese Patent Application No. 2020-552311, dated Nov. 8, 2021 in 10 pages including English translation.
International Search Report for International Application No. PCT/EP2019/055024, dated Jun. 18, 2019 in 18 pages Including English Translation.
Rosochowski et al., "Modelling of density and dimensional changes in re-pressing/sizing of sintered components", Journal of Materials Processing Technology, vols. 80-81, August, 1, 1998, pp. 188-194.
German Search Report for German Patent Application No. DE102018107637.1, dated Nov. 30, 2018 in 134 pages.
Written Opinion for International Application No. PCT/EP2019/055024, dated Oct. 8, 2020 in 8 pages.

* cited by examiner

CALIBRATION METHOD

CROSS-REFERENCE TO RELATED APPLICATIONS

This application is the U.S. National Phase under 35. U.S.C. § 371 of International Application PCT/EP2019/055024, filed Feb. 28, 2019, which claims priority to German Patent Application No. 10 2018 107 637.1, filed Mar. 29, 2018. The disclosures of the above-described applications are hereby incorporated by reference in their entirety.

FIELD OF THE INVENTION

The invention relates to a method for calibrating pressed parts, in particular sintered pressed parts, a method for producing a calibrated pressed part, a control device for controlling a calibration of pressed parts, in particular sintered pressed parts, a calibration press device and a system for producing calibrated pressed parts, in particular sintered pressed parts.

BACKGROUND OF THE INVENTION

Calibration is understood to mean the re-compacting and re-shaping of pressed parts, especially sintered pressed parts, (by a further pressing procedure) to improve the dimensional accuracy and/or surface quality and/or increase the density of the pressed part. With currently known calibration presses, a defined calibration sequence is usually carried out unchanged until the press is stopped and manual modifications are made, if necessary.

DE 10 2010 009 800 B3 describes a high-precision calibration of a component. DE 10 2015 201 966 A1 describes the control of a powder press. EP 1 964 664 B1 describes an automatic control and correction of a punch stroke. For this purpose, the dimensions of a shaped product produced are detected. In DE 103 01 224 A1 a method for hydraulic calibration or powder presses for the final position control of the respective press for dimensionally accurate moulded parts is described. During the pressing procedure, a characteristic press value (e.g. the position of the press punch) is measured depending on another characteristic pressing value (e.g. pressing force) and the final position of the punch already advanced and located in press position is corrected depending on the measurement. In this way a target thickness of a pressed part can be adjusted with high accuracy, for example during a calibration procedure. However, the method according to DE 103 01 224 A1 is considered to be comparatively complex overall.

SUMMARY OF THE INVENTION

The object of the present invention is to propose a method for calibrating pressed parts, in particular sintered pressed parts, by which the smallest possible manufacturing tolerance of the pressed part after calibration can be maintained in a simple manner.

Furthermore, the object of the invention is to propose a corresponding method for the production of a calibrated pressed part, a corresponding control device for controlling a calibration of pressed parts, in particular sintered pressed parts, a corresponding calibration press device and a corresponding system for the production of calibrated pressed parts, in particular sintered pressed parts.

In particular, the object is solved by a method for calibrating (preferably sintered) pressed parts, wherein a calibration procedure of each individual pressed part is controlled (possibly regulated) depending on at least one specific pressed part parameter of the respective pressed part measured before calibration and/or depending on at least one production parameter of a preceding pressing and/or sintering step of the respective pressed part.

A central idea of the invention is to measure a specific pressed part parameter before the calibration of each individual pressed part and/or to detect a production parameter of a preceding pressing and/or sintering step of each individual pressed part and to control (in particular to regulate) the calibration procedure of each individual pressed part depending on the measuring/detected values.

In contrast to the state of the art, in particular the parameters of the preceding process steps (pressing, especially powder pressing or sintering, respectively) as well as (alternatively or additionally) press part specific properties of the individual press part before calibration (e.g. geometric dimensions, weight and/or density—as such) are thus taken into account during calibration. By using (at least in one alternative) the specific pressed part parameters of the individual pressed part as such, a comparatively simple method is achieved (especially in comparison to DE 103 01 224 A1, where an attempt is made to compensate for different pressed part thicknesses by adjusting a pressing force and pressing position in the calibrated pressed part).

In particular, a clear correlation between a pressed part weight and pressed part height after calibration could be determined in calibration tests carried out, even if the examined pressed parts had approximately identical geometrical properties before calibration. Furthermore, it was found that by a calibration sequence, which was adapted on the pressed part specific parameters or preceding method steps, respectively, (in particular a pressed part specific force/position regulation), significantly narrower pressed part tolerances can be maintained after calibration, if one or more specific parameters are known for each (individual) pressed part before calibration (for example, a pressed part height, a pressed part width, a segment height, a weight, a density, a pressing force during (powder) pressing and/or a pressing position during (powder) pressing) and are taken into account in the calibration sequence and the resulting calibration positions.

A pressed part height is understood to mean in particular a length of the (entire) pressed part in the axial direction or pressing direction, respectively (during a pressing step preceding calibration). A segment height is understood to mean in particular a height of a segment of the pressed part in the axial direction or pressing direction, respectively (during a pressing step preceding calibration). A pressed part width is understood to mean in particular a (maximum) extension of a radial section of a pressed part or a cross-section of the pressed part perpendicular to the pressing direction (during a pressing step preceding calibration).

Preferably, the calibration of each individual pressed part is carried out depending on a (previously measured) parameter inherent to the pressed part, in particular a weight and/or a geometric dimension, preferably a height, in particular pressed part height and/or segment height, and/or a volume, and/or a density of the pressed part (as a respective specific pressed part parameter or as respective specific pressed part parameters, respectively). Particularly in the case of control (regulation) depending on a weight and/or a density of the pressed part, pressed part heights can be achieved with low manufacturing tolerances.

In general, a specific pressed part parameter of the respective pressed part is to be understood as a parameter inherent to the pressed part, i.e. defining its structural-physical characteristics. By contrast, a production parameter is to be understood as a parameter which is not inherent to the respective pressed part but is linked to it, in particular by a preceding manufacturing step (preceding the calibration step), preferably a (powder) pressing step and/or sintering step of the respective pressed part. In this respect, a production parameter can be understood to be a "pressing and/or sintering parameter", unless otherwise specified or unless otherwise evident from the context.

In a preferred, alternative embodiment, the calibration of each individual pressed part is controlled (or regulated) depending on a (previously determined or transmitted) press position (of a press path) and/or a pressing force of a preceding (powder) pressing procedure (as production parameter). The pressing position or pressing force, respectively, can be determined within a method for the production of a calibrated pressed part, in particular it can be measured or, within the calibration method itself, it can be provided (transmitted) as input.

Pressing position (pressing path) is preferably understood to be the position (path), e.g. final position, of a respective press punch (which is used for calibration or previous (powder) pressing, respectively). Pressing force is preferably understood to mean the force applied by the respective press punch (used for calibration or previous (powder) pressing, respectively) during pressing.

The control (regulation) of the calibration sequence preferably comprises a control (regulation) of a force and/or a position (of a path or punch path, respectively) during calibration. According to this embodiment, the pressing force during calibration is not (directly) dependent on the pressing position (or vice versa), but is set depending on the previously determined press part parameter and/or production parameter. It is, however, also optionally possible to additionally control (regulate) the pressing force during calibration depending on the pressing position during calibration.

A calibration press is preferably not stopped during the calibration of the pressed parts (it is therefore in particular a continuous process in which continuously or successively individual pressed parts, in particular sintered pressed parts, are arranged in the calibration press and are then calibrated according to the method described above). Stopping means in particular halting the calibration press after completion of an individual calibration procedure (of an individual pressed part) (which is done, for example, in the state of the art, in order to be able to change the calibration settings manually).

A/the calibration press device is preferably not stopped during calibration of an individual pressed part (i.e. the speed of a punch during calibration pressing is always greater than zero during pressing of the individual pressed part until a punch end position is reached). Thus, a simple and yet accurate calibration can be achieved.

The method of calibration may comprise calibrating a plurality of (sintered) pressed parts, for example at least 10 or at least 100 or at least 1000 pressed parts, wherein a single calibration procedure of a single one of the plurality of pressed parts has a duration of preferably less than 30 seconds, more preferably less than 10 seconds.

The object mentioned above is further solved in particular by a method for producing a calibrated pressed part, comprising the following steps:
    pressing a starting material, in particular powder, to form a pressed part,
    preferably sintering of the pressed part,
    calibrating the (sintered) pressed part according to the method described above.

The object mentioned above is further solved in particular by a control device for controlling (in particular regulating) a calibration of (preferably sintered) pressed parts, preferably in accordance with the method described above, wherein the control device is configured to control (in particular regulate) a calibration procedure of each individual pressed part depending on at least one specific pressed part parameter of the respective pressed part measured before calibration and/or depending on at least one production parameter of a preceding pressing and/or sintering step of the respective pressed part.

The control device preferably comprises at least one means (in particular comprising one or more sensors) for determining a weight and/or a density and/or a geometric dimension, in particular a height, preferably pressed part height and/or pressed part width and/or segment height and/or a volume and/or a density of the pressed part (as specific pressed part parameter or specific pressed part parameters, respectively).

The control device may include at least one means for detecting a pressing position and/or a pressing force of a preceding (powder) pressing process (as a production parameter).

In addition, the control device can be configured to control (regulate) a pressing force and/or a pressing position (of a punch) during calibration.

The object mentioned above is further solved in particular by a calibration press device, comprising the control device mentioned above.

The object mentioned above is further solved in particular by a system for the production of calibrated (sintered) pressed parts, comprising:
    a press device for pressing a starting material, in particular powder, into a pressed part,
    preferably a sintering device for sintering the pressed part and
    a calibration press device of the type mentioned above.

Preferably the system comprises at least one means for determining (measuring) a pressing force and/or pressing position when pressing the starting material (powder).

In embodiments, at least one calibrating pressed part parameter can be detected after calibration (of a respective pressed part), for example a weight and/or a density and/or a geometric dimension, in particular a height, preferably pressed part height and/or segment height, and/or a volume, and/or a density of the pressed part. This at least one calibrating pressed part parameter can be used (in particular in combination with at least one pressed part parameter of a subsequent pressed part measured before calibration and/or at least one production parameter of a/the subsequent pressed part) for continuous optimization (re-adjustment) of the calibration of a/the subsequent pressed part.

Further embodiments result from the dependent claims.

BRIEF DESCRIPTION OF THE DRAWINGS

In the following, the invention is described by means of embodiments, which are explained in more detail by means of the figures. These show:

In the following description, the same reference numbers are used for identical and equivalent parts.

FIG. 1 shows a schematic view of an inventive system for the production of calibrated sintered pressed parts.

Figure 1:
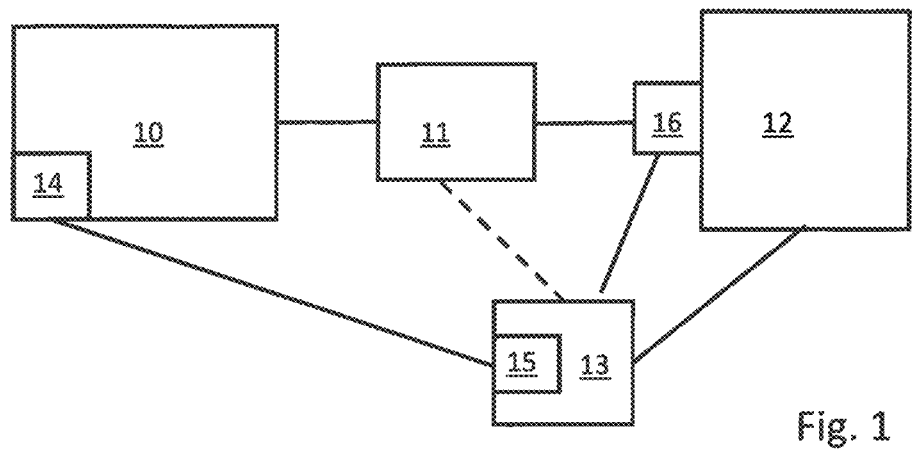
FIG. 1 a schematic view of a system for the production of calibrated, sintered pressed parts.

The system comprises a powder press device 10, a sintering device 11, a calibration press device 12 and a control device 13.

In the powder press device 10 a pressed part is produced from a starting material (powder).

In particular, a means 14 for determining (measuring) a pressing position (of a punch path) and/or a pressing force may be provided in the powder press device 10. For example, a (total) punch path and/or a starting position of the punch (before pressing) and/or a final position of the punch can be determined. If necessary, the punch position can also be measured depending on time (in particular continuously). Alternatively or additionally a punch force can be measured, for example depending on time during pressing. In particular, a dependence of the pressing position on the pressing force (and/or vice versa) can also be determined.

DETAILED DESCRIPTION OF THE PREFERRED EMBODIMENTS

Corresponding production parameters (in particular pressing position and/or pressing force) can then be transmitted to the control device 13. For this purpose, the control device 13 has in particular a means 15 for receiving (detecting) the one or more production parameter(s) from the means 14 for determining a pressing position and/or pressing force of the powder press device 10.

In addition, a parameter of the sintering device 11 (e.g. a sintering temperature or sintering temperature curve) can optionally be recorded (detected) by the control device 13 or its means 15 for recording a production parameter. The control device 13 further comprises a means 16 for determining at least one pressed part parameter (for example weight and/or density and/or a geometric dimension, in particular height, preferably pressed part height and/or pressed part width and/or segment height and/or a volume). The means 16 for determining a pressed part parameter can be an integral part of the control device 13 or be connected to it (so that communication can take place between the means 16 and the control device 13).

Depending on production parameters which are transmitted by the powder press device 10 (or its device 14 for determining at least one production parameter) and/or the sintering device 11 and/or data which are provided by the means 16 for determining at least one press part parameter (and transmitted to the control device 13, if necessary), the control device 13 now controls the calibration press device 12, in particular with regard to a pressing position and/or a pressing force.

The control device 13 may be an integral part of the calibration press device 12 or may be provided as a separate component (and communicate with the calibration press device 12 wirelessly or by wire). The means 16 for determining at least one pressed part parameter can also be an integral part of the calibration press device or be designed as a separate component.

Figure 2:
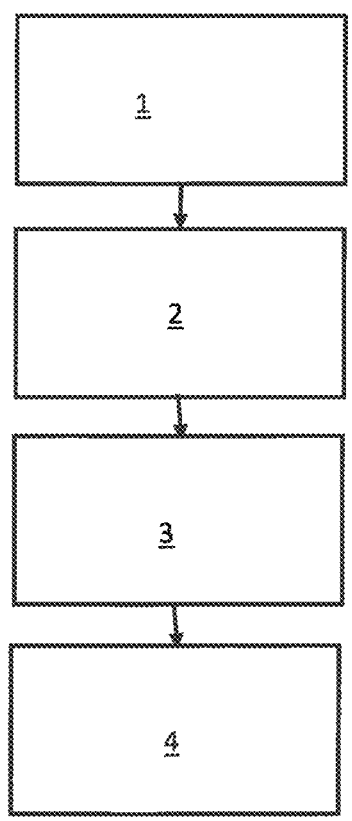
FIG. 2 a diagram explaining a calibration method according to the invention.

FIG. 2 shows a schematic sequence for the production of an individual calibrated, sintered pressed part. In step 1, a pressed part is first pressed from a powder (starting material). This is then sintered in step 2. Then, in a step 3, at least one production parameter (which optionally has been measured during step 1 and/or 2) is recorded (detected) and/or at least one pressed part parameter is determined (detected), in particular measured. Then the actual calibration (i.e. pressing of the sintered pressed part into the final product, namely the calibrated sintered pressed part) is carried out in step 4 taking into account the production parameter and/or pressed part parameter.

Unless otherwise evident from the respective context, a "pressed part" is understood to mean a part (product) which is obtained by pressing in a (powder) press device; a "sintered pressed part" is understood to mean a part (product) which is pressed and sintered; and a "calibrated sintered pressed part" is understood to mean a part (final product) which has passed through the method step of calibration and is ready for use (optionally with minor finishing steps).

It should be noted at this point that all the parts described above, taken individually and in any combination, in particular the details shown in the drawings, are claimed to be essentially inventive. Modifications thereof are familiar to the skilled person.

REFERENCE SIGNS

1 Process step "pressing"
2 Process step "sintering"
3 Process step "determination of parameter"
4 Procedure step "calibration"
10 (Powder) press device
11 Sintering device
12 Calibration press device
13 Control device
14 Means for determining at least one production parameter
15 Means for recording at least one production parameter
16 Means for determining at least one pressed part parameter

What is claimed is:

1. A method for calibrating sintered pressed parts comprising:
controlling a calibration press in a calibration procedure of each of a plurality of individual pressed parts depending on at least one specific pressed part parameter of the respective pressed part measured before calibration and/or depending on at least one production parameter of a preceding pressing and/or sintering of the respective pressed part, wherein the calibration of each individual pressed part is controlled depending on a density of each individual pressed part, wherein the calibration press does not stop during the calibration procedure of each individual pressed part, wherein the plurality of pressed parts comprises at least 10 pressed parts, wherein a single calibration procedure of a single one of the plurality of pressed parts has a duration of less than 30 seconds.

2. The method according to claim 1, wherein the calibration of each individual pressed part is controlled further depending on a geometric dimension.

3. The method according to claim 1 wherein the calibration of each individual pressed part is controlled depending on a pressing position and/or a pressing force of a preceding (powder) pressing procedure as the at least one production parameter.

4. The method according to claim 1, wherein the control of the calibration sequence comprises a control of a pressing force and/or a pressing position during calibration.

5. A method of producing a calibrated press part, comprising:
pressing a starting material into a pressed part,
sintering of the pressed part,
calibrating of the sintered pressed part according to claim 1.

6. A controller for controlling a calibration of sintered pressed parts according to claim 1, wherein the controller is configured to control a calibration procedure of each individual pressed part depending on at least one specific pressed part parameter of the respective pressed part measured before calibration and/or depending on at least one production parameter of a preceding pressing and/or sintering step of the respective pressed part, wherein the controller is further configured to determine the density of each individual pressed part.

7. The controller according to claim 6, wherein the controller is further configured to determine a geometric dimension.

8. The controller according to claim 6, wherein the controller comprising at least one sensor configured to detect a pressing position and/or a pressing force of a preceding pressing procedure for measuring a pressing position and/or a pressing force as the at least one production parameter.

9. The controller according to claim 6, wherein the controller is configured to control a pressing force and/or a pressing position during calibration.

10. A calibration press, comprising the controller according to claim 6.

11. A system for the production of calibrated sintered pressed parts comprising:

a press for pressing a starting material into a pressed part,
a sintering device for sintering the pressed part and
a calibration press according to claim 10.

12. The system according to claim 11, wherein the controller is further configured to determine a pressing force and/or pressing position when pressing the starting material.

13. The method according to claim 2, wherein the calibration of each individual pressed part is controlled depending on a pressed part height and/or segment height, and/or a volume of the pressed part.

14. The method according to claim 5, wherein the starting material is powder.

15. The controller according to claim 6, wherein the controller is further configured to determine a pressed part height and/or segment height, and/or a volume of the pressed part.

16. The system according to claim 11, wherein the starting material is powder.

17. The method according to claim 1, wherein the plurality of pressed parts comprises at least 100 pressed parts.

18. The method according to claim 1, wherein the plurality of pressed parts comprises at least 1000 pressed parts.

19. The method according to claim 1, wherein said duration is less than 10 seconds.

* * * * *